(12) United States Patent
Schweizer

(10) Patent No.: US 10,753,255 B2
(45) Date of Patent: Aug. 25, 2020

(54) METHOD FOR OPERATING AN SCR CATALYTIC CONVERTER SYSTEM WHICH HAS A FIRST SCR CATALYTIC CONVERTER AND A SECOND SCR CATALYTIC CONVERTER

(71) Applicant: Robert Bosch GmbH, Stuttgart (DE)

(72) Inventor: Frank Schweizer, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 16/124,476

(22) Filed: Sep. 7, 2018

(65) Prior Publication Data

US 2019/0078481 A1    Mar. 14, 2019

(30) Foreign Application Priority Data

Sep. 12, 2017    (DE) .................. 10 2017 216 082

(51) Int. Cl.
| | | |
|---|---|---|
| *F01N 3/20* | (2006.01) | |
| *F01N 9/00* | (2006.01) | |
| *F01N 11/00* | (2006.01) | |
| *F01N 13/00* | (2010.01) | |

(52) U.S. Cl.
CPC .......... *F01N 3/208* (2013.01); *F01N 3/2066* (2013.01); *F01N 9/00* (2013.01); *F01N 11/00* (2013.01); *F01N 13/0093* (2014.06); *F01N 2560/021* (2013.01); *F01N 2560/026* (2013.01); *F01N 2610/02* (2013.01); *F01N 2900/1622* (2013.01); *F01N 2900/1812* (2013.01); *F01N 2900/1814* (2013.01)

(58) Field of Classification Search
CPC .......... F01N 3/2066; F01N 3/208; F01N 9/00; F01N 11/00; F01N 13/0093; F01N 2560/021; F01N 2560/026; F01N 2610/02; F01N 2900/1622; F01N 2900/1812; F01N 2900/1814
See application file for complete search history.

(56) References Cited

U.S. PATENT DOCUMENTS

| | | | |
|---|---|---|---|
| 2011/0265452 A1 | 11/2011 | Geveci et al. | |
| 2012/0017568 A1* | 1/2012 | Geveci ................. | F01N 9/00 60/274 |
| 2013/0115150 A1 | 5/2013 | Fritsch et al. | |
| 2017/0130628 A1* | 5/2017 | Franz ................. | F01N 3/023 |
| 2017/0218828 A1* | 8/2017 | Schweizer ........... | F01N 13/009 |
| 2017/0234199 A1* | 8/2017 | Sun ....................... | F01N 9/005 60/286 |

* cited by examiner

*Primary Examiner* — Audrey K Bradley
(74) *Attorney, Agent, or Firm* — Michael Best & Friedrich LLP

(57) ABSTRACT

A method (300) for operating an SCR catalytic converter system which has a first SCR catalytic converter (12) and a second SCR catalytic converter, characterized by a step of controlling (310) an $NH_3$ mass flow after the first SCR catalytic converter (12).

16 Claims, 6 Drawing Sheets

METHOD FOR OPERATING AN SCR CATALYTIC CONVERTER SYSTEM WHICH HAS A FIRST SCR CATALYTIC CONVERTER AND A SECOND SCR CATALYTIC CONVERTER

BACKGROUND OF THE INVENTION

The present invention relates to a method for operating an SCR catalytic converter system which has a first SCR catalytic converter and a second SCR catalytic converter, to a computer program, to a machine-readable storage medium and to an electronic control device.

In order to satisfy ever stricter emissions legislation (Euro6, Tier2Bin5 and further-reaching emissions regulations), it is necessary to reduce nitrogen oxides (NOx) in the exhaust gas of internal combustion engines, in particular diesel engines. A known practice for this purpose is to arrange an SCR catalytic converter (selective catalytic reduction) in the exhaust region of internal combustion engines, said catalytic converter reducing nitrogen oxides contained in the exhaust gas of the internal combustion engine to nitrogen in the presence of a reducing agent. This enables the proportion of nitrogen oxides in the exhaust gas to be considerably reduced. The process of reduction requires ammonia ($NH_3$), which is added to the exhaust gas. $NH_3$ or reagents which release $NH_3$ are therefore metered into the exhaust line. In general, an aqueous urea solution (urea/water solution) is used for this purpose, said solution being injected ahead of the SCR catalytic converter in the exhaust line. Ammonia forms from this solution and acts as a reducing agent. A 32.5% aqueous urea solution is commercially available under the trade name AdBlue®. In order to achieve high conversion rates of the nitrogen oxides to be reduced in an SCR catalytic converter system, the SCR catalytic converter must be operated in such a way that it is continuously filled with the reducing agent ammonia up to a certain level. The efficiency of an SCR catalytic converter is dependent on the temperature, on the space velocity and, very decisively also, on the $NH_3$ filling level thereof.

SCR catalytic converters store a certain quantity of ammonia on their surface through absorption. In addition to the directly metered ammonia (in the form of urea/water solution), therefore, there is also stored $NH_3$ available for NOx reduction, as a result of which efficiency is increased over a depleted catalytic converter. The storage behavior is dependent on the respective operating temperature of the catalytic converter. The lower the temperature, the higher is the storage capacity. If the reservoir of the catalytic converter is completely filled, however, there can be what is referred to as ammonia slip in the event of step changes in load, even if no more reducing agent is being metered in. In the case of ammonia slip, only some of the ammonia contained in the reducing agent and introduced into the exhaust gas upstream of the SCR catalytic converter is converted by means of the SCR catalytic converter.

If as high as possible NOx conversion rates are to be achieved, it is indispensable to operate the SCR system at a high $NH_3$ filling level. In order to increase SCR efficiency more quickly after a cold start with a neutral impact on $CO_2$ emissions, the SCR catalytic converter is installed closer to the engine and, in some cases, combined with a diesel particle filter (DPF) to form an "SCRF" catalytic converter (SCR catalytic converter on diesel particle filter). In such close proximity to the engine, however, the temperature gradients are also higher, and the temperature level rises to an absolute temperature level which is too high for SCR operation in the full load range. For this reason, a second SCR catalytic converter is therefore generally used, this converter optionally being mounted under the floor. To operate an SCRF/SCR system, particularly when two metering valves are used, an optimum interplay between the SCRF catalytic converter and the second SCR catalytic converter is required for optimum operation with very high NOx efficiencies. When using two metering valves, the first metering valve is mounted ahead of the SCRF catalytic converter and the second metering valve is mounted ahead of the second SCR catalytic converter.

In modern systems, there are two setpoint filling levels for an SCRF catalytic converter, a minimum level with a reduced NOx efficiency without or only with a relatively high $NH_3$ slip and a maximum filling level for high NOx conversion with a low $NH_3$ slip, up to about 200 ppm. First of all, the SCRF catalytic converter is operated with a maximum filling level, the NOx efficiency is very high, and the $NH_3$ slip which occurs is absorbed by the second SCR catalytic converter. At a low NOx slip but a high $NH_3$ slip from the SCRF catalytic converter, the $NH_3$ filling level in the second SCR catalytic converter rises quickly beyond the minimum filling level of the second SCR catalytic converter. Even the minimum filling level in the second SCR catalytic converter causes high NOx conversion but there is still filling level capacity for $NH_3$ slip from the SCRF catalytic converter. If the $NH_3$ filling level in the second SCR catalytic converter is above the minimum filling level and below the maximum filling level, the setpoint $NH_3$ filling level in the SCRF catalytic converter is lowered in accordance with an interpolation factor. If the filling level in the second SCR catalytic level rises as far as the maximum filling level or above, the setpoint $NH_3$ filling level in the SCRF catalytic converter is accordingly lowered to a minimum filling level, ensuring that no $NH_3$ slip occurs. The method described functions well and, in principle, a system having two SCR catalytic converters can be brought under control by this means. However, the method has the disadvantage that the response is only to the $NH_3$ slip, i.e. to the $NH_3$ filling level in the second SCR catalytic converter, not to a deviation of the current $NH_3$ slip from the desired $NH_3$ slip. This means that the control system can rapidly trend towards overshooting and that NOx performance may be lost in the process.

SUMMARY OF THE INVENTION

The method for operating an SCR catalytic system which has a first SCR catalytic converter and a second SCR catalytic converter is characterized by a step of controlling an $NH_3$ mass flow after the first SCR catalytic converter. The terms $NH_3$ mass flow and $NH_3$ slip are intended to be synonymous. This has the advantage that the $NH_3$ slip or the deviation of the $NH_3$ slip from a setpoint value can be detected much earlier ahead of the second SCR catalytic converter and therefore that it is possible to exert an influence over changes in the $NH_3$ filling level in the second SCR catalytic converter much earlier than if it is only the $NH_3$ filling level of the second SCR catalytic converter which is controlled. This procedure prevents severe overshooting of the $NH_3$ filling level in the second SCR catalytic converter and thus makes control much more accurate and robust.

According to a preferred embodiment, control of the $NH_3$ mass flow after the SCR catalytic converter is performed by a first control system adjusting an actual value of the $NH_3$ mass flow after the first SCR catalytic converter to a setpoint value of the $NH_3$ mass flow after the first catalytic converter.

This control advantageously ensures that the actual value is adjusted to the setpoint value.

Since, in general, only sensors are arranged between the first SCR catalytic converter and the second SCR catalytic converter, the expression "after the first SCR catalytic converter" is generally intended to be a synonym of the expression "ahead of the second SCR catalytic converter".

The setpoint value of the $NH_3$ mass flow of the first catalytic converter is preferably determined by a model of the second SCR catalytic converter. To determine the setpoint value of the $NH_3$ mass flow ahead of the second SCR catalytic converter, a suitable catalytic converter model capable of calculating a realistic $NH_3$ mass flow can be used. As an alternative or in addition to the model, it is also possible to calculate the setpoint value of the $NH_3$ mass flow analytically.

Irrespective of how the setpoint value of the $NH_3$ mass flow is calculated, it is possible to pose the question as to how the $NH_3$ mass flow looks in the optimum case. Under steady-state conditions and with a set $NH_3$ filling level in the first SCR catalytic converter, the $NH_3$ filling level in the second SCR catalytic converter should also not change. This means that the $NH_3$ mass flow in the second SCR catalytic converter, which is equal to the sum of the $NH_3$ mass flow from the first SCR catalytic converter and the quantity metered in ahead of the first SCR catalytic converter, should be stoichiometrically equal to the $NH_3$ consumption in the second SCR catalytic converter, which, on the other hand, is equal to the product of the NOx mass flow after the first SCR catalytic converter and the current efficiency of the second SCR catalytic converter.

If the $NH_3$ filling level in the second SCR catalytic converter is to be increased, this can be brought about either by increasing the $NH_3$ mass flow from the first SCR catalytic converter or by injecting ammonia via a second metering valve ahead of the second SCR catalytic converter if such a second metering valve is available.

If, however, the $NH_3$ filling level in the second SCR catalytic converter is to be reduced, the $NH_3$ slip from the first SCR catalytic converter must be lowered. If the $NH_3$ setpoint value from the SCR model is used, the model data set can be optimized iteratively from measurements with the aid of simulation methods. In this process, a maximum possible overall NOx performance with an acceptable $NH_3$ slip after the second SCR catalytic converter should be achieved.

According to a preferred embodiment, the $NH_3$ filling level in the second SCR catalytic converter is constant if the $NH_3$ filling level in the first SCR catalytic converter is steady and set. This has the advantage of a steady state, which is what is intended, as already explained above.

According to another preferred embodiment, the actual value of the $NH_3$ mass flow after the first SCR catalytic converter is measured with the aid of a sensor between the first SCR catalytic converter and the second SCR catalytic converter. The sensor is preferably an $NH_3$ sensor. This has the advantage that the $NH_3$ mass flow can be determined very accurately. As an alternative or in addition, however, the ammonia mass flow between the two SCR catalytic converters can also be determined with the aid of an NOx sensor, see document DE 10 2016 201 602 A1, which discloses a method for determining an ammonia mass flow between two SCR catalytic converters arranged in series in an exhaust line. This has the advantage that an $NH_3$ sensor can be dispensed with. When using an $NH_3$ sensor, a very accurate value for the $NH_3$ slip ahead of the second SCR catalytic converter is obtained, and thus the NOx mass flow ahead of the second SCR catalytic converter can likewise be accurately determined from the composite signal of the NOx sensor, which has cross sensitivity to $NH_3$. In this case, the accurate values for the mass flows of NOx and $NH_3$ ahead of the second SCR catalytic converter are known.

As a further preferred option, the setpoint value of the $NH_3$ mass flow after the first SCR catalytic converter is calculated as the product of a current model efficiency of the second SCR catalytic converter and an NOx mass flow ahead of the second SCR catalytic converter. This feature has the advantage that, in this case, the $NH_3$ mass flow after the first SCR catalytic converter is of exactly the same magnitude as the modeled $NH_3$ consumption in the second catalytic converter. This setpoint value of the $NH_3$ mass flow corresponds to the $NH_3$ consumption in the second SCR catalytic converter. The NOx mass flow ahead of the second SCR catalytic converter is preferably measured by means of an NOx sensor.

It is possible to modify the actual $NH_3$ value quickly and simply by way of the NOx efficiency requirement of the catalytic converter model of the first SCR catalytic converter, for example. For each SCR catalytic converter, there is a fixed relationship between NOx conversion and $NH_3$ slip at a given $NH_3$ filling level and SCR temperature. As the NOx efficiency requirement rises, the catalytic converter receives a higher metered quantity, on the one hand directly via the increased feedforward quantity and indirectly via the feedback control processes, which continuously compare the model with the value measured by the sensor in respect of the NOx mass flow after the second SCR catalytic converter. As the physical filling level rises, the $NH_3$ slip increases accordingly. In the case of the analytical catalytic converter model, a change in the NOx efficiency requirement can be best carried out by modifying the frequency factor for NOx. The frequency factor can be used as the manipulated variable for feedback control.

According to another embodiment, a controller output of the first control system changes the current model efficiency of the model of the second SCR catalytic converter in accordance with the control error, which corresponds to a difference between the actual value of the $NH_3$ mass flow after the first SCR catalytic converter and the setpoint value of the $NH_3$ mass flow after the first SCR catalytic converter. The controller output preferably sets an updated model efficiency through the change in the frequency factor used in the model for NOx in the first SCR catalytic converter.

According to the collision theory, the frequency factor A of the Arrhenius equation is the product of the collision frequency Z and the orientation factor P. In chemical kinetics, the Arrhenius equation describes the quantitative dependence of the reaction rate constants k on the temperature for the special case of monomolecular reactions and is as follows:

$$k = A \cdot e^{-\frac{E_A}{R \cdot T}}$$

where $E_A$ is the activation energy, R is the universal gas constant and T is the temperature.

The controller output of the first control system is preferably not changed if a temperature of the first SCR catalytic converter is lower than a lower temperature threshold or higher than an upper temperature threshold. The lower temperature threshold is preferably 250° C. The upper temperature threshold is preferably 550° C. At low temperatures, e.g. less than 250° C., the $NH_3$ filling level in the first SCR catalytic converter cannot be raised to such an extent as to generate $NH_3$ slip, and this is also not worthwhile owing to the necessary filling level reduction in the case of heating. On the other hand, there are disturbances such as oxidation at very high temperatures, e.g. greater than 550° C. For these reasons, the correction variable should be limited to a range in between, this advantageously being achieved by means of the indicated feature.

The abovementioned method preferably has a second control system, which controls the $NH_3$ filling level of the second SCR catalytic converter. In general, the $NH_3$ slip after the first SCR catalytic converter is a rapidly changing controlled variable. The $NH_3$ filling level of the second SCR catalytic converter, which is generally significantly more sluggish, is preferably controlled by means of a second control system. The first control system and the second control system are preferably coupled to one another.

According to a preferred embodiment, the second control system controls the filling levels of the first SCR catalytic converter and of the second SCR catalytic converter in each case between a minimum filling level and a maximum filling level. Here, the filling level of the second SCR catalytic converter is adjusted to the minimum filling level of the second SCR catalytic converter if the first SCR catalytic converter is at a maximum filling level. The first SCR catalytic converter is preferably adjusted to the maximum filling level since the overall efficiency of the first and second SCR catalytic converters is at its maximum when the first SCR catalytic converter is adjusted to a maximum filling level and the second SCR catalytic converter is adjusted to a minimum filling level. If the first SCR catalytic converter is at a minimum filling level and the second SCR catalytic converter is at a maximum filling level, the overall efficiency is minimal.

According to a preferred embodiment, the first SCR catalytic converter is operated in such a way that the NOx mass flow generated is stoichiometrically the same as the $NH_3$ mass flow generated. This has the advantage that the $NH_3$ filling level in the second SCR catalytic converter remains constant.

According to another preferred embodiment, the setpoint value of the $NH_3$ mass flow after the first SCR catalytic converter is multiplied by a multiplicative correction factor, and an offset is added thereto. In this case, both the multiplicative correction factor and the offset are selected by means of respective characteristic curves. Both the characteristic curve for the multiplicative correction factor and the characteristic curve for the offset have as a parameter a second control error, which corresponds to a difference between a setpoint value of the $NH_3$ filling level of the second SCR catalytic converter and an actual value of the $NH_3$ filling level of the second SCR catalytic converter. By means of the stated changes in the control circuit, i.e. a change to the setpoint value of the $NH_3$ mass flow after the first SCR catalytic converter in the first control system by multiplication with the correction factor and possible addition of the offset, it is advantageously ensured that the $NH_3$ filling level of the second SCR catalytic converter is controlled.

According to a preferred embodiment, the multiplicative correction factor is equal to 1 and the offset is equal to zero if the setpoint value of the $NH_3$ filling level of the second SCR catalytic converter is equal to the actual value of the $NH_3$ filling level of the second SCR catalytic converter. In this case, the $NH_3$ filling level of the second catalytic converter is set and there is no need for further intervention in the control of the first control system, and therefore the multiplicative correction factor is equal to 1 and the offset is equal to zero.

According to another preferred embodiment, the multiplicative correction factor is equal to 1 and the offset is greater than zero if the setpoint value of the $NH_3$ filling level of the second SCR catalytic converter is greater than the actual value of the $NH_3$ filling level of the second SCR catalytic converter. In this case, the $NH_3$ filling level of the second catalytic converter must be increased. This is achieved, inter alia, by setting the multiplicative correction factor to 1 and the offset to a value greater than zero. It is thereby advantageously possible to increase the actual value of the $NH_3$ filling level.

According to yet another preferred embodiment, the multiplicative correction factor is less than zero and the offset is equal to zero if the setpoint value of the $NH_3$ filling level of the second SCR catalytic converter is less than the actual value of the $NH_3$ filling level of the second SCR catalytic converter. In this case, the $NH_3$ filling level of the second catalytic converter must be lowered. This is achieved by means of a multiplicative correction factor less than 1 since, in this case, the setpoint value of the $NH_3$ mass flow after the first SCR catalytic converter is advantageously lowered.

The computer program is configured to carry out each step of the method, in particular when it runs on an electronic control device or processor. This allows the implementation of the method in a conventional control device without having to make structural modifications thereto. For this purpose, the computer program is stored on a machine-readable storage medium. Loading the computer program onto a conventional electronic control device gives the electronic control device which is configured to operate an SCR catalytic converter system which has a first SCR catalytic converter and a second SCR catalytic converter.

Further advantages and embodiments of the invention will become apparent from the description and the attached drawings.

It is self-evident that the features mentioned above and those explained below can be used not only in the respectively indicated combination but also in other combinations or in isolation without exceeding the scope of the present invention.

BRIEF DESCRIPTION OF THE DRAWINGS

An illustrative embodiment of the invention is illustrated in the drawings and explained in greater detail in the following description.

DETAILED DESCRIPTION

Figure 1:
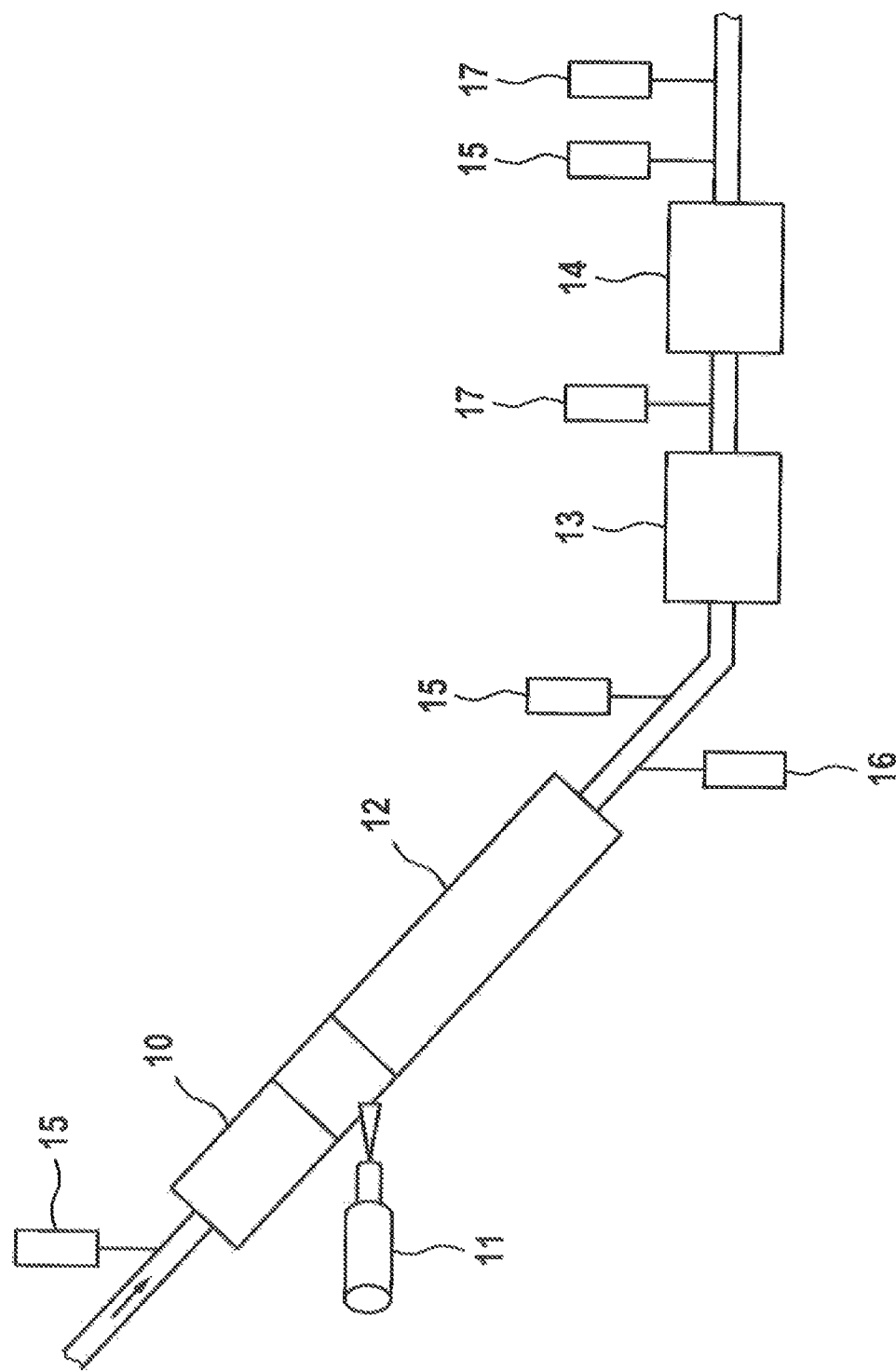
FIG. 1 shows schematically an SCR catalytic converter system, which has two SCR catalytic converters and which is suitable for carrying out the method according to the invention.

FIG. 1 shows an illustrative arrangement of the components in the exhaust line of an internal combustion engine having two SCR catalytic converters. In an exhaust gas aftertreatment system of this kind, the method according to the invention can be used to advantage. However, the method can also be employed in other exhaust gas aftertreatment systems which have two or more SCR catalytic converters. In this embodiment of the exhaust gas aftertreatment system, a diesel oxidation catalytic converter (DOC) 10 is provided first in the exhaust gas flow direction, followed in the exhaust gas flow direction by a metering device 11 for the reagent of the SCR devices. Provided after this in the exhaust gas flow direction is a first SCR catalytic converter 12, which is embodied as a particle filter with an SCR coating (SCRF). A second SCR catalytic converter 13 is arranged after the first SCR catalytic converter 12. Finally, another catalytic converter, in this case a cleanup cat (CuC) 14, is provided in order to complete exhaust gas aftertreatment. The arrow indicates the flow direction of the exhaust gas. Various sensors are furthermore provided, in particular nitrogen oxide sensors 15, an $NH_3$ sensor 16 and temperature sensors 17. The values that can be detected by means of the sensors 15, 16 and 17 are used for process management.

Figure 2:
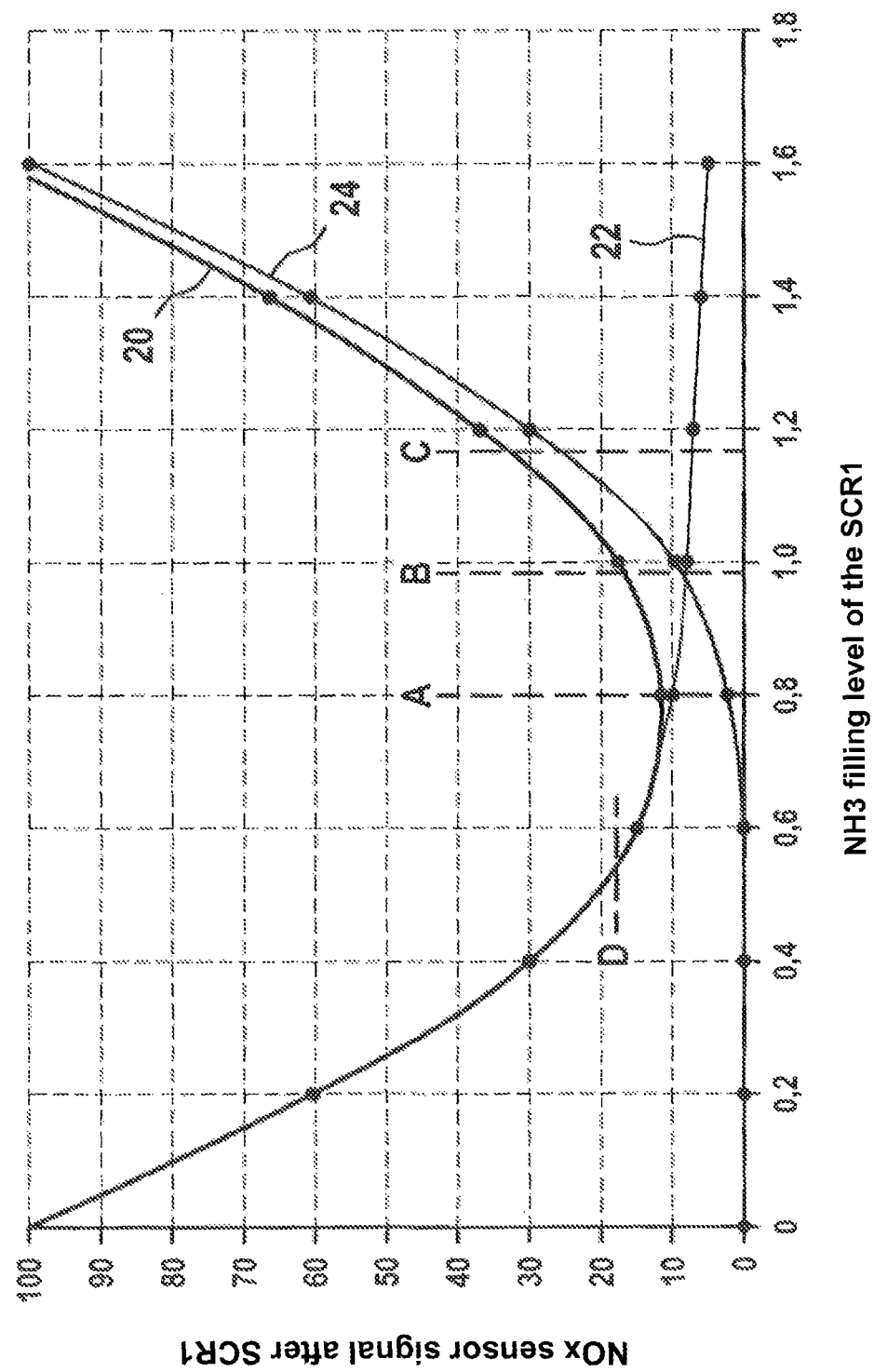
FIG. 2 shows the NOx and $NH_3$ emissions after the SCR catalytic converter as a function of an $NH_3$ filling level of the SCR catalytic converter for a certain temperature of a typical SCR catalytic converter. For an SCR catalytic converter of this kind, different operating points which are used for the first SCR catalytic converter in accordance with the method according to the invention are explained.

The NOx sensor signal 20 after the first SCR catalytic converter 12 is plotted in FIG. 2. Since the NOx sensor has a cross sensitivity for $NH_3$, the NOx sensor signal 20 is a combination of the individual signal 22 for NOx and of the individual signal 24 for $NH_3$ with a parabolic profile. The individual signal 24 for $NH_3$ was measured with an $NH_3$ sensor. The individual signal 22 for NOx can then be calculated as the difference between the NOx sensor signal 20 and the individual signal 24 for $NH_3$. The NOx sensor signal 20 shows a typical profile for a conventional SCR catalytic converter for a certain temperature. The NOx sensor signal 20 is plotted as a function of the $NH_3$ filling level of the first SCR catalytic converter 12. In the prior art, the practice of operating an individual SCR catalytic converter in range D is known, where the SCR catalytic converter has a low $NH_3$ filling level and virtually no $NH_3$ slip occurs. In this case, the operating point is safely on the NOx side in order to ensure stable system adaptation or NOx control. The model or setpoint value is sufficiently far from the minimum of the composite curve to obtain the required control margin.

If a system is being operated with two SCR catalytic converters and steady-state operating conditions have been achieved, the operating point B can be set, where the amount of NOx produced is stoichiometrically equal to the $NH_3$ slip produced after the first SCR catalytic converter 12. This means that the $NH_3$ filling level in the second SCR catalytic converter 13 is not changed because the NOx and $NH_3$ flowing out of the first catalytic converter is fully converted. If there is a need to increase the $NH_3$ filling level in the second SCR catalytic converter 13 because of a dynamic change or a disturbance in the overall system, this corresponding to cooling of the second SCR catalytic converter 13, the operating point can be shifted in direction C, where more $NH_3$ is produced than NOx.

If there is a need to lower the $NH_3$ filling level of the second SCR catalytic converter 13, which corresponds to heating of the second SCR catalytic converter 13, the operating point can be shifted in direction A, where more NOx than $NH_3$ is available.

One advantage here is that the NOx performance is significantly enhanced over the conventional operating point D at operating points A, B or C of the first SCR catalytic converter 12 of an overall system having two SCR catalytic converters. With the optimized design, the NOx slip after the first SCR catalytic converter 12 can generally be approximately half that at operating point D of a conventional method.

From FIG. 2, it can be seen that the $NH_3$ slip is the decisive variable for determining the precise situation. Points A, B and C differ only very slightly in efficiency and the slope of the individual signal 22 for NOx is already very shallow at this point. Much clearer here is the difference in the individual signal 24 for $NH_3$, which in this case rises sharply as the $NH_3$ filling level rises. This means that it is possible to make a rapid percentage change in the $NH_3$ mass flow emitted from the first SCR catalytic converter 12 by switching between points A, B and C.

Figure 3A:
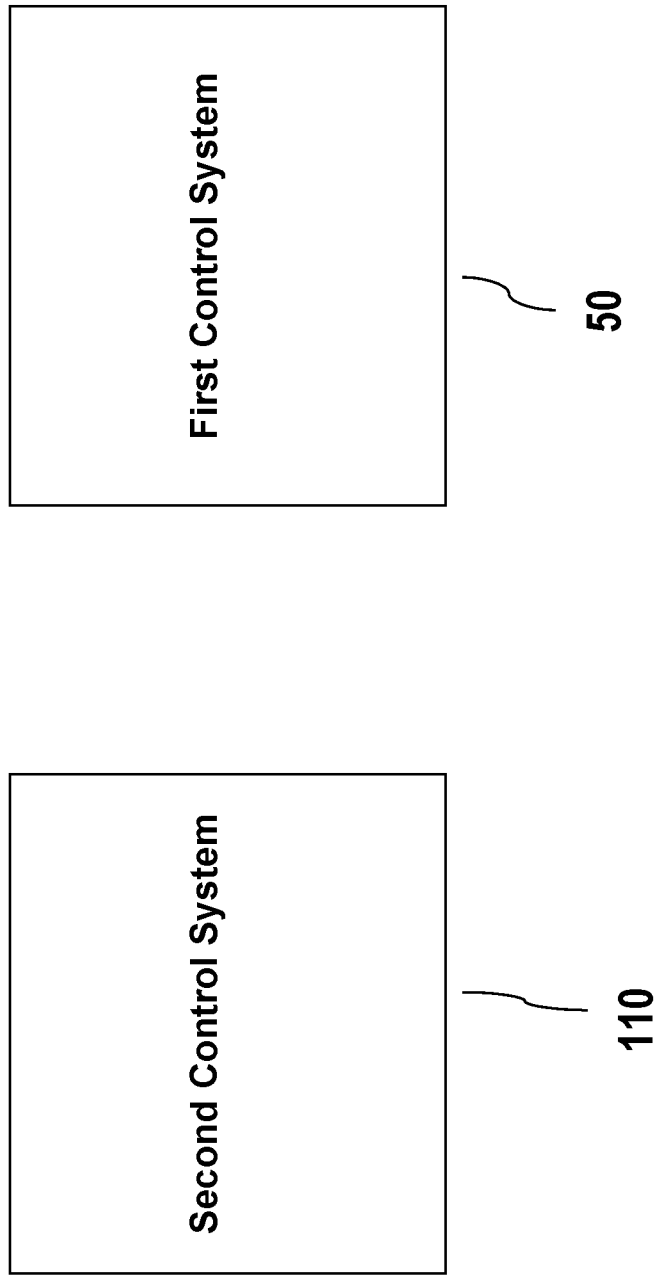
FIG. 3A shows a first control system and a second control system.
Figure 3B:
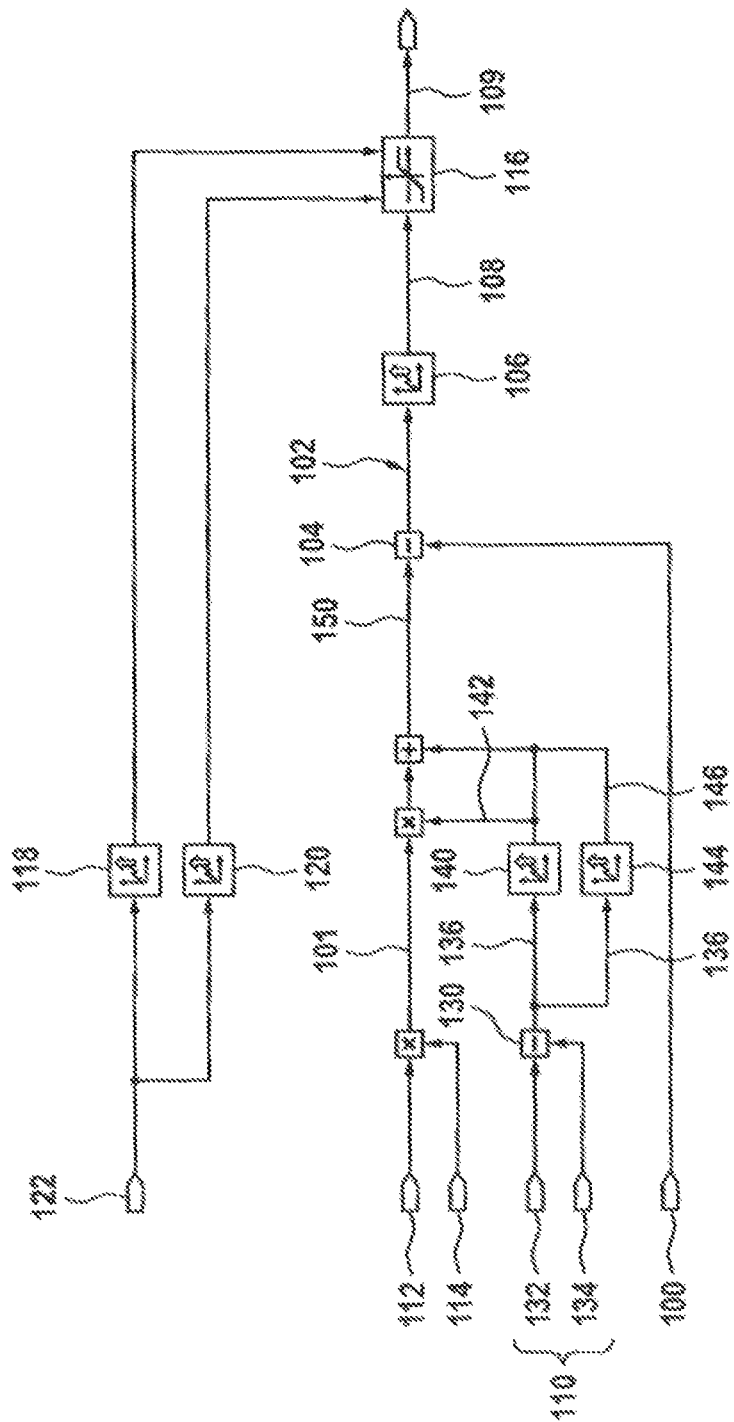
FIG. 3B shows a signal flow diagram relating to the operation of an illustrative embodiment of the method according to the invention.

FIG. 3B shows the fundamental mode of operation of the method according to the invention in a signal flow diagram. The first control system 50 which adjusts an actual value 100 of the $NH_3$ mass flow after the first SCR catalytic converter 12 to a setpoint value 101 of the $NH_3$ mass flow after the first catalytic converter, is implemented by the determination of a control error 102, which is implemented by the minus operator 104, and a subsequent characteristic curve 106. If the second control system 110 is initially left out of account, the minus operator 104 subtracts the setpoint value 101 of the $NH_3$ mass flow after the first SCR catalytic converter 12 from the actual value 100 of the $NH_3$ mass flow after the first SCR catalytic converter 12, thereby giving the control error 102. The characteristic curve 106 assigns the control error 102 a new model efficiency 108, which is then essentially used to adapt and thus recalculate the setpoint value 101 of the $NH_3$ mass flow after the first catalytic converter. The setpoint value 101 of the $NH_3$ mass flow after the first catalytic converter is calculated as the product of an NOx mass flow 112 ahead of the second SCR catalytic converter 13 and a current model efficiency 114 of the second SCR catalytic converter 13. However, the new model efficiency 108 is corrected by means of a temperature-dependent correction 116 to give a corrected new model efficiency 109. The temperature-dependent correction 116 has two inputs for an output of a limiting characteristic curve 118 for a maximum correction factor and for an output of a limiting characteristic curve 120 for a minimum correction factor, wherein both the limiting characteristic curve 118 for a maximum correction factor and a limiting characteristic curve 120 for a minimum correction factor each have a mean temperature 122 of the first SCR catalytic converter 12 as an input variable. The temperature-dependent correction 116 has the effect that the current model efficiency 114 is no longer modified above an upper temperature threshold and below a lower temperature threshold.

The second control system 110 then modifies the first control system 50 explained above as follows. By means of the minus operator 130, a second control error 136 is formed as the difference between a setpoint value 132 for the $NH_3$ filling level in the second SCR catalytic converter 13 and an actual value 134 for the $NH_3$ filling level in the second SCR catalytic converter 13. A characteristic curve 140 assigns a multiplicative correction factor 142 to the second control error 136, and a characteristic curve 144 assigns an offset 146 to the second control error 136. The setpoint value 101 of the $NH_3$ mass flow after the first SCR catalytic converter 12 is multiplied by the multiplicative correction factor 142, and the offset 146 is added to the result obtained in this way, giving a corrected setpoint value 150 for the $NH_3$ mass flow after the first SCR catalytic converter 12.

Taking account of the second control system 110, the control error 102 is then formed as the difference between the corrected setpoint value 150 for the $NH_3$ mass flow after the first SCR catalytic converter 12 and the actual value 100 of the $NH_3$ mass flow after the first SCR catalytic converter 12.

Each model efficiency corresponds to a particular frequency factor of the Arrhenius equation for NOx. However, since the model efficiency is changed by the control described above, it is not a particular frequency factor which is obtained but a frequency range for the first SCR catalytic converter 12. This frequency range can be adapted over a surface life of the overall system in a further, higher-level control circuit if there is $NH_3$ slip after the second SCR catalytic converter 13.

Figure 4:
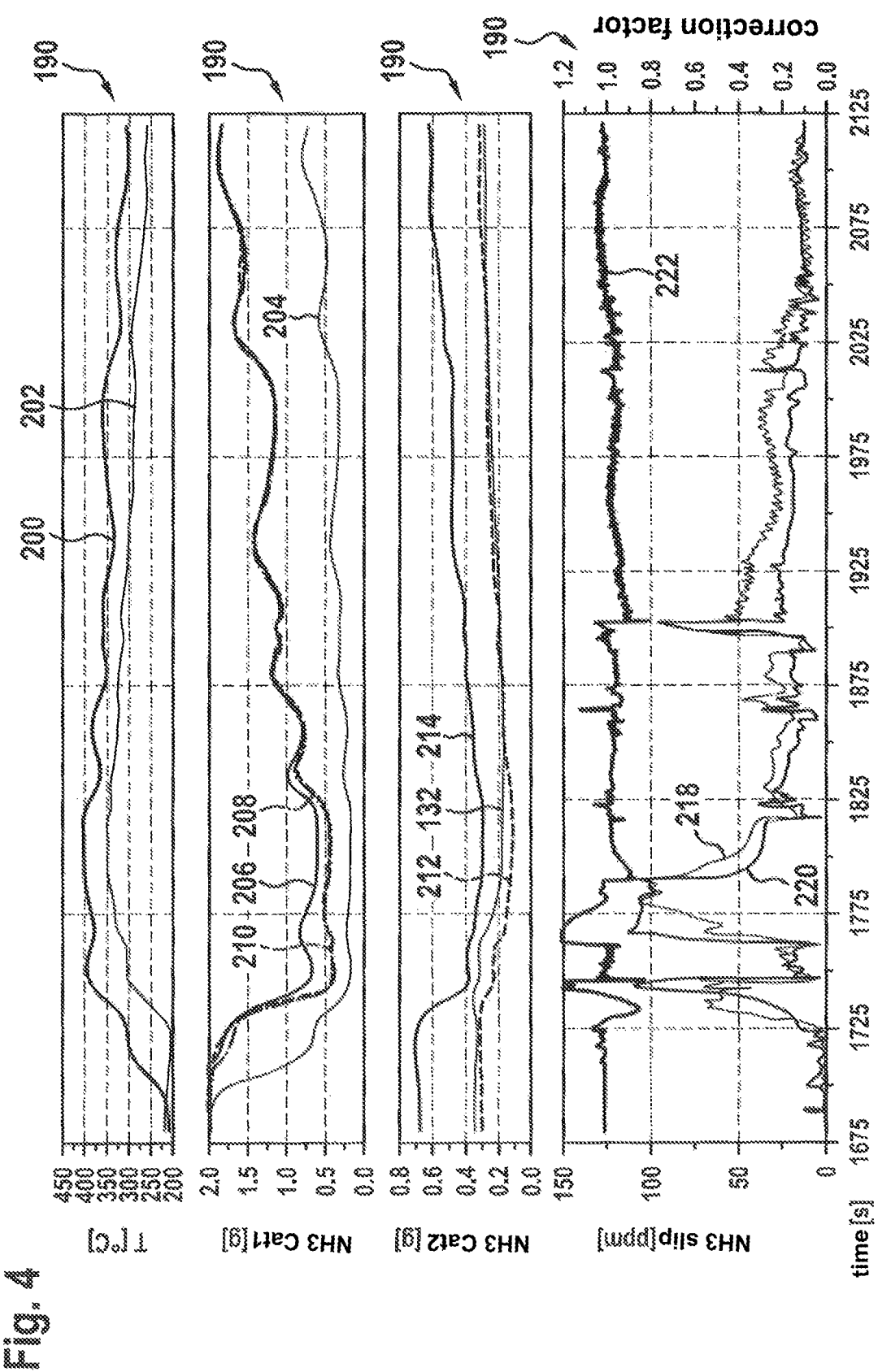
FIG. 4 shows a measurement at an SCR catalytic converter system which has two SCR catalytic converters while the method according to the invention is being carried out.

FIG. 4 shows a measurement of the method according to the invention in a critical situation. Here, a whole series of measured variables is detected as a function of time. FIG. 4 has four measurement windows 190. The uppermost measurement window 190 shows a temperature 200 in the first SCR catalytic converter 12 and a temperature 202 in the second SCR catalytic converter 13. The second measurement window 190 below this shows a minimum $NH_3$ filling level 204 in the first SCR catalytic converter 12, a maximum $NH_3$ filling level 206 in the first SCR catalytic converter 12, a setpoint value 208 for the $NH_3$ filling level in the first SCR catalytic converter 12 and a current $NH_3$ filling level 210 in the first SCR catalytic converter 12. The third measurement window 190 shows a minimum $NH_3$ filling level 212 in the second SCR catalytic converter 13, a maximum $NH_3$ filling level 214 in the second SCR catalytic converter 13 and a setpoint value 132 for the $NH_3$ filling level in the second SCR catalytic converter 13. The fourth measurement window 190 shows an $NH_3$ slip 218 after the first SCR catalytic converter 12, a setpoint value 220 for the $NH_3$ slip after the first SCR catalytic converter 12 and a multiplicative correction factor 222.

A high load point or a regeneration in the nitrogen oxide storage catalytic converter (NSC or NOx storage catalyst) causes a high temperature gradient. This temperature wave reaches the first SCR catalytic converter 12 and raises the catalytic converter temperature in the first SCR catalytic converter 12 from just above 200° C. to about 400° C. within about 25 seconds. Owing to the temperature increase, the setpoint value 208 of the $NH_3$ filling level in the first SCR catalytic converter 12 initially falls, as does, with a delay, the setpoint value 132 of the $NH_3$ filling level in the second SCR catalytic converter 13. The setpoint value 220 for the $NH_3$ slip after the first SCR catalytic converter 12 is determined in such a way that the $NH_3$ filling level of the second SCR catalytic converter 13 remains as far as possible in the corridor between the minimum $NH_3$ filling level 212 and the maximum $NH_3$ filling level 214. If the temperature 200 of the first SCR catalytic converter 12 is below 280° C., the setpoint value 220 of the $NH_3$ slip and the actual value 218 of the $NH_3$ slip are close to zero, see temperature 200, $NH_3$ slip 218 after the first SCR catalytic converter 12 and setpoint value 220 for the $NH_3$ slip after the first SCR catalytic converter 12 in the range between 1675 and 1725 seconds. Above about 280° C. in the first SCR catalytic converter 12, the limiting characteristic curve 120 for a minimum correction factor of the $NH_3$ slip controller allows a correction. Subsequently, see the range after 1725 seconds, the $NH_3$ slip 218 after the first SCR catalytic converter 12 follows the setpoint value 220 for the $NH_3$ slip after the first SCR catalytic converter 12.

Figure 5:
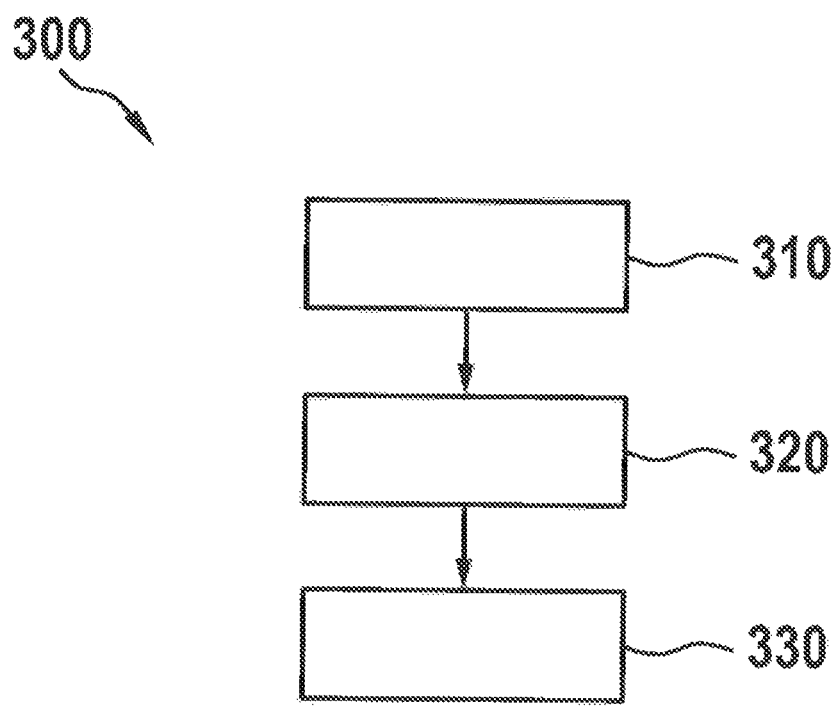
FIG. 5 shows a method for operating an SCR catalytic converter system.

FIG. 5 shows a method 300 for operating an SCR catalytic converter system which has a first SCR catalytic converter 12 and a second SCR catalytic converter 13. In a first step 310, an $NH_3$ mass flow after the first SCR catalytic converter 12 is controlled. During this process, an actual value 100 of the $NH_3$ mass flow after the first SCR catalytic converter 12 is adjusted in a first control system 50 to a setpoint value 101 of the $NH_3$ mass flow after the first catalytic converter 12. Furthermore, the setpoint value 101 of the $NH_3$ mass flow after the first catalytic converter 12 is determined by means of a model of the second SCR catalytic converter 13.

The setpoint value 101 of the $NH_3$ mass flow after the first SCR catalytic converter 12 is calculated as the product of a current model efficiency 114 of the second SCR catalytic converter 13 and an NOx mass flow 112 ahead of the second SCR catalytic converter 13.

In a second step 320, a controller output 108 of the first control system 50 changes the current model efficiency of the model of the second SCR catalytic converter 13 in accordance with a control error 102, which corresponds to a difference between the actual value 100 of the $NH_3$ mass flow after the first SCR catalytic converter 12 and the setpoint value 101 of the $NH_3$ mass flow after the first SCR catalytic converter 12.

In this case, if a temperature of the first SCR catalytic converter 12 is lower than a lower temperature threshold or higher than an upper temperature threshold, the controller output 108 of the first control system 50 is not changed.

In a further step 330, a second control system 110 controls the $NH_3$ filling level of the second SCR catalytic converter 13. The second control system 110 controls the filling levels of the first SCR catalytic converter 12 and of the second SCR catalytic converter 13 between in each case a minimum filling level 204, 212 and a maximum filling level 206, 214, wherein, if the first SCR catalytic converter 12 is at a maximum filling level 206, the filling level of the second SCR catalytic converter 13 is adjusted to the minimum filling level 212 of the second SCR catalytic converter 13.

In this process, the setpoint value 101 of the $NH_3$ mass flow after the first SCR catalytic converter 12 is multiplied by a multiplicative correction factor 142 and an offset 146 is added thereto, wherein both the multiplicative correction factor 142 and the offset 146 are selected by means of respective characteristic curves 140, 144, and wherein both the characteristic curve 140 for the multiplicative correction factor 142 and the characteristic curve 144 for the offset 146 have as a parameter a second control error 136, which corresponds to a difference between a setpoint value 132 of the $NH_3$ filling level of the second SCR catalytic converter 13 and an actual value 134 of the $NH_3$ filling level of the second SCR catalytic converter 13.

The invention claimed is:

1. A method (300) for operating an SCR catalytic converter system that has a first SCR catalytic converter (12) and a second SCR catalytic converter (13), the method comprising:

processing, by a first control system, a value (132, 134) for an $NH_3$ filling level of the second SCR catalytic converter (13) in a manner that causes the first control system to control (310) an $NH_3$ mass flow after the first SCR catalytic converter (12); and changing (320), by a controller output (108, 109) of the first control system, a current model efficiency of a model of the second SCR catalytic converter (13), wherein the first control system changes the current model efficiency in accordance with a difference between an actual value (100) of the NH$_3$ mass flow after the first SCR catalytic converter (12) and a corrected setpoint value (150) of the NH$_3$ mass flow after the first SCR catalytic converter (12).

2. The method (300) according to claim 1, further comprising:

controlling (330), by a second control system (110), the NH$_3$ filling level of the second SCR catalytic converter (13) in a manner that causes the NH$_3$ filling level of the second SCR catalytic converter (13) to remain between a minimum NH$_3$ filling level (212) of the second SCR catalytic converter (13) and a maximum NH$_3$ filling level (214) of the second SCR catalytic converter (13).

3. The method (300) according to claim 2, wherein the value (132, 134) for an NH$_3$ filling level of the second SCR catalytic converter (13) is from the group consisting of a setpoint value (132) of the NH$_3$ filling level of the second SCR catalytic converter (13) and an actual value (134) of the NH$_3$ filling level of the second SCR catalytic converter (13).

4. The method (300) according to claim 2, wherein when an NH$_3$ filling level of the first SCR catalytic converter (12) is at a maximum NH$_3$ filling level (206) of the first SCR catalytic converter (12), the second control system (110) adjusts the NH$_3$ filling level of the second SCR catalytic converter (13) to a filling level that is between the minimum NH$_3$ filling level (212) of the second SCR catalytic converter (13) and the maximum NH$_3$ filling level (214) of the second SCR catalytic converter (13).

5. The method (300) according to claim 4, further comprising:

controlling (330), by the second control system (110), the NH$_3$ filling level of the first SCR catalytic converter (12) in a manner that causes the NH$_3$ filling level of the first SCR catalytic converter (12) to remain between a minimum NH$_3$ filling level (212) of the first SCR catalytic converter (12) and the maximum NH$_3$ filling level (214) of the first SCR catalytic converter (12).

6. The method (300) according to claim 1, wherein the first control system adds an offset (146) to a multiplication product in a manner that creates the corrected setpoint value (150) of the NH$_3$ mass flow after the first SCR catalytic converter (12).

7. The method (300) according to claim 6, wherein the first control system multiplies a setpoint value (101) of the NH$_3$ mass flow after the first SCR catalytic converter (12) by a multiplicative correction factor (142) in a manner that produces the multiplication product.

8. The method (300) according to claim 7, wherein the setpoint value (101) of the NH$_3$ mass flow after the first SCR catalytic converter (12) is a product of an NOx mass flow (112) ahead of the second SCR catalytic converter (13) and a current model efficiency (114) of the second SCR catalytic converter (13).

9. The method (300) according to claim 7, wherein the first control system selects the multiplicative correction factor (142) by a characteristic curve (140).

10. The method (300) according to claim 9, wherein the first control system selects the offset (146) by another characteristic curve (144).

11. A non-transitory, machine-readable storage medium containing a computer program, the computer program when executed by the computer causes a computer to perform the method (300) according to claim 1.

12. An electronic control device that is configured to operate an SCR catalytic converter system, the SCR catalytic converter system has a first SCR catalytic converter (12) and a second SCR catalytic converter (13), the electronic control device comprising:

a first control system configured to:

control (310) an NH$_3$ mass flow after the first SCR catalytic converter (12) by processing a value (132, 134) for an NH$_3$ filling level of the second SCR catalytic converter (13), output a controller output (108, 109) that changes (320) a current model efficiency of a model of the second SCR catalytic converter (13), and change the current model efficiency in accordance with a difference between an actual value (100) of the NH$_3$ mass flow after the first SCR catalytic converter (12) and a corrected setpoint value (150) of the NH$_3$ mass flow after the first SCR catalytic converter (12).

13. The electronic control device according to claim 12, wherein the value (132, 134) for an NH$_3$ filling level of the second SCR catalytic converter (13) is from the group consisting of a setpoint value (132) of the NH$_3$ filling level of the second SCR catalytic converter (13) and an actual value (134) of the NH$_3$ filling level of the second SCR catalytic converter (13).

14. The electronic control device according to claim 12, further comprising:

a second control system (110) configured to control (330) the NH$_3$ filling level of the second SCR catalytic converter (13) causing the NH$_3$ filling level of the second SCR catalytic converter (13) to remain between a minimum NH$_3$ filling level (212) of the second SCR catalytic converter (13) and a maximum NH$_3$ filling level (214) of the second SCR catalytic converter (13).

15. The electronic control device according to claim 14, wherein when an NH$_3$ filling level of the first SCR catalytic converter (12) is at a maximum NH$_3$ filling level (206) of the first SCR catalytic converter (12), the second control system (110) adjusts the NH$_3$ filling level of the second SCR catalytic converter (13) to a filling level that is between the minimum NH$_3$ filling level (212) of the second SCR catalytic converter (13) and the maximum NH$_3$ filling level (214) of the second SCR catalytic converter (13).

16. The electronic control device according to claim 14, wherein the second control system (110) is configured to control (330) the NH$_3$ filling level of the first SCR catalytic converter (12) in a manner that causes the NH$_3$ filling level of the first SCR catalytic converter (12) to remain between a minimum NH$_3$ filling level (212) of the first SCR catalytic converter (12) and the maximum NH$_3$ filling level (214) of the first SCR catalytic converter (12).

* * * * *